INVENTOR.
GENE HIRS
By
Wilson, Settle & Craig
ATTORNEYS

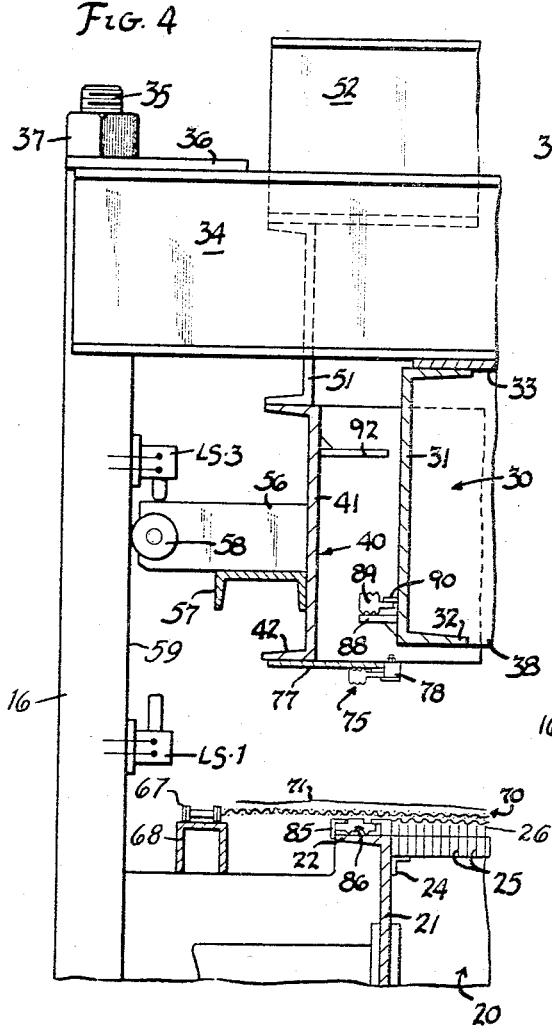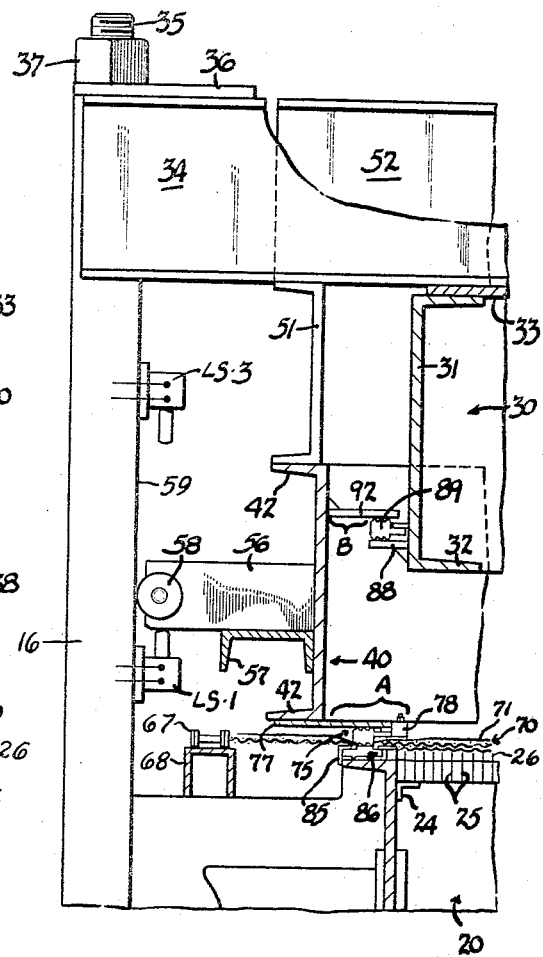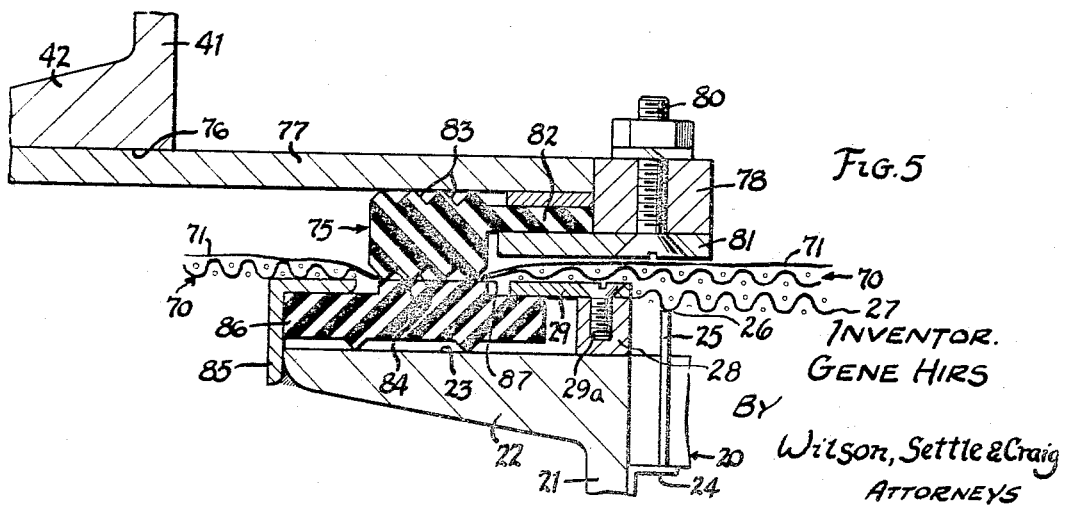

INVENTOR.
GENE HIRS
BY
Wilson, Settle & Craig
ATTORNEYS

United States Patent Office 3,333,693
Patented Aug. 1, 1967

3,333,693
FILTERING METHOD AND APPARATUS
Gene Hirs, 17208 Greenview, Detroit, Mich. 48219
Filed Nov. 13, 1964, Ser. No. 411,009
16 Claims. (Cl. 210—65)

The present invention relates to a method of and apparatus for the filtration of contaminant particles from a liquid. More particularly, the present invention relates to filtration apparatus and method wherein a filter medium is interposed between a pair of fixed liquid-conducting shells having open, spaced, confronting faces and a peripheral seal frame is telescopically related to the shells for movement to a first sealing position at which the frame fixes and seals the filter medium in its interposed position and to a second open position at which the filter medium is free for movement in order that it may be replaced or replenished.

In United States Letters Patent No. 2,867,326, I have disclosed a filter apparatus utilizing a pair of relatively movable, fluid-conducting shells capable of sealingly clamping a filter medium therebetween. One of these shells is movably mounted and is appropriately actuated, as by a fluid pressure cylinder, between a medium clamping position and a medium releasing position. While filter apparatus of this type is extremely practical and has been a commercial success, the utilization of such filters in relatively large sizes, i.e., in excess of about 30 square feet of filter area, have posed substantial practical problems. For example, such a mechanism having a filter area of only 40 square feet and operating at a pressure differential of 5 pounds across the filter medium requires a closure force of 14 tons. If such a filter were operated at 30 pounds pressure differential, the closure force would be six times as great. Similarly, if the filter area were increased four times, the required closure force would be quadrupled. Thus, in the utilization of filter apparatus of the basic design of Patent No. 2,867,326, the fact that the shells, per se, are relatively movable imposes huge loads upon the filter closure mechanism.

A different type of approach is proposed in Patent No. 2,867,324, wherein the filter shells are fixed, but a pneumatically expansible seal is utilized. Apparatus of this type has been constructed, but it has been impossible, so far, to obtain an expansible seal which is sufficiently rugged in use and sufficiently foolproof in function to withstand operating conditions of the order set forth above.

The present invention now proposes a totally new and different approach to both the method of and apparatus for filtering. In order to resist the huge forces generated interiorly of filter apparatus of appreciable size, the present invention proposes the utilization of fixed filter shells which can be adequately reinforced by means of a rigid structure. To provide a seal for the filter medium interposed between the open, confronting faces of the shell, a telescopically movable seal frame is utilized, such a frame being provided with seal elements engageable with the filter medium for confining the filter medium against one of the shells and with secondary sealing elements sealing the frame to the other of the shells. The seal frame has a minimal area exposed to the liquid pressure and can readily be held in sealing position by means of a relatively small actuating mechanism, e.g., a fluid pressure actuated cylinder. Actually, in the herein illustrated preferred embodiment of the invention, the pressure of incoming fluid aids in retaining the shells closed. Thus, only minimal forces act on the frame, e.g., the sealing force itself (whether the fluid pressure differential or an extraneous actuating force) and any slight lateral forces tending to expand the seal and the seal frame.

By utilizing simple, perimetric, compression or gasket-type seals directly engageable with the filter medium and displacing the filter medium into sealing engagement with one of the shells, an extremely simple and practical, efficient sealing structure is provided which can be readily incorporated into an automatic filtration apparatus and method. By merely displacing the seal frame relative to the filter medium and the filter shells, the filter medium is free to be moved for replacement or replenishment. Thus, by integrating the fluid pressure actuated cylinder for the seal frame into the over-all structure and control circuit for the apparatus, an automated filtration apparatus and method can be readily obtained.

It is, therefore, an important object of the present invention to provide a new and improved apparatus for and method of filtering contaminant particles from a liquid.

Another important object of the present invention is the provision of an improved filter apparatus wherein a filter medium is interposed between the spaced, confronting, open faces of a pair of fixed fluid-conducting shells, and a seal frame is provided for movement relative to the shells and to the filter medium for sealing the filter medium to the periphery of one of the shells, thereby confining the flow of fluid introduced into one of the shells through the filter medium into the other of the shells.

It is a further important object of the present invention to provide a new and novel method of filtering contaminant particles from a liquid by interposing a liquid permeable filter medium between the open confronting faces of a pair of fixed filter shells, and displacing the filter medium into peripheral sealing contact with one of the shells by the telescopic movement of a seal frame which is sealed to the other of the shells and which has a peripheral sealing element directly engageable with the filter medium.

A further, and no less important, object of this invention is the provision of a filter apparatus wherein a seal frame is telescopically movable about the periphery of one of a pair of fixed fluid conducting shells to confine a filter medium against the other of the shells, the seal frame bearing a peripheral seal engageable with the filter medium interposed between the shells and being secondarily sealed to the one of the filter shells to peripherally confine liquid for flow through the filter medium, the seal frame being retained in closed position by the internal pressure differential and being actuated for movement by a fluid pressure cylinder or the like actuating means which need not resist the forces generated by the pressure of fluid confined by the shells.

Other objects of this invention will appear in the following description and appended claims, reference being had to the accompanying drawings forming a part of this specification wherein like reference characters designate corresponding parts in the several views.

In the drawings:

FIGURE 3 is an enlarged, fragmentary, vertical sectional view taken along the plane 3—3 of FIGURE 2 illustrating the seal in a closed operative position;

FIGURE 4 is a view similar to FIGURE 3 illustrating the seal in an inoperative or open position;

FIGURE 5 is a greatly enlarged fragmentary sectional view similar to FIGURE 3 and illustrating further the seal structure;

As shown in the drawings:

*The embodiment of FIGURES 1 through 6*

Figure 1:
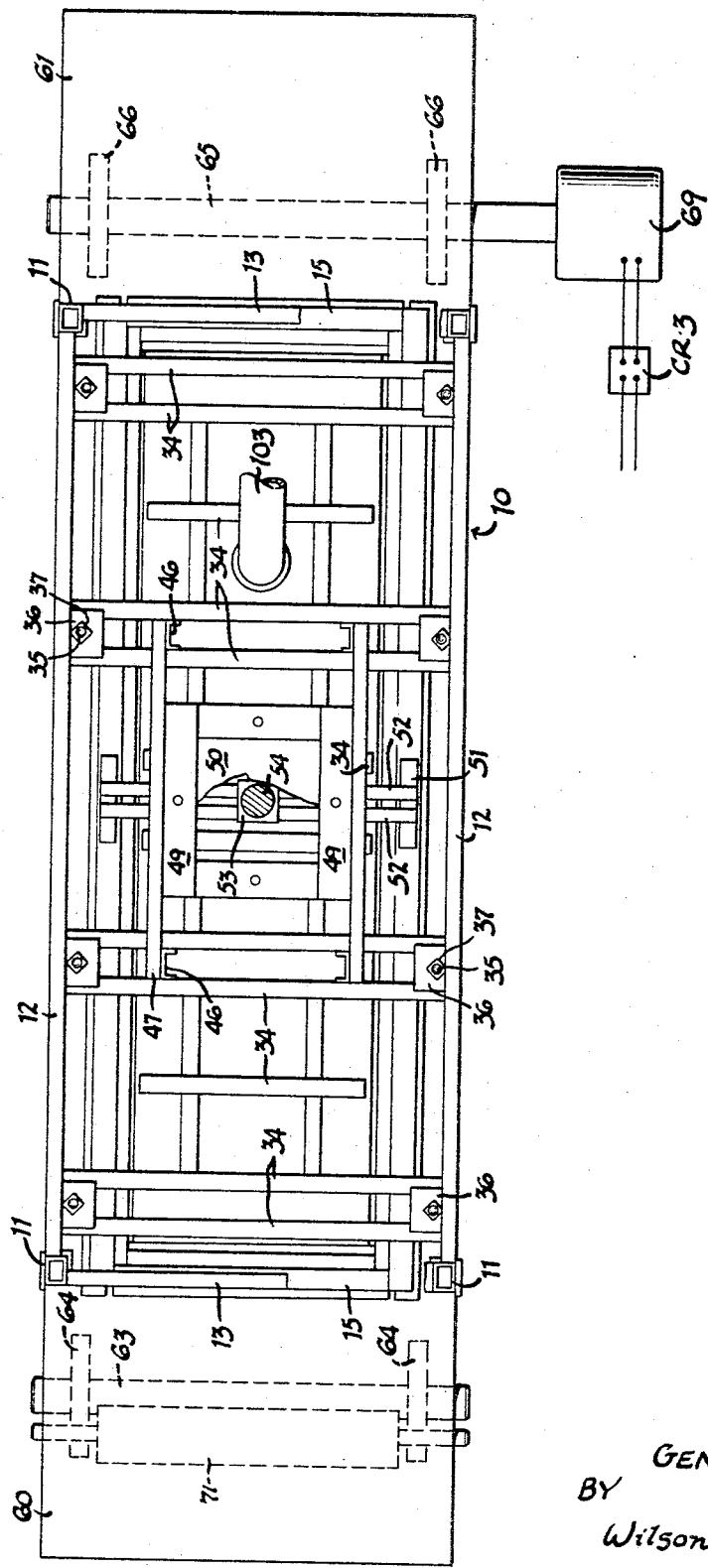
FIGURE 1 is a plan view of the filter apparatus of the present invention capable of carrying out the method of the present invention.
Figure 2:
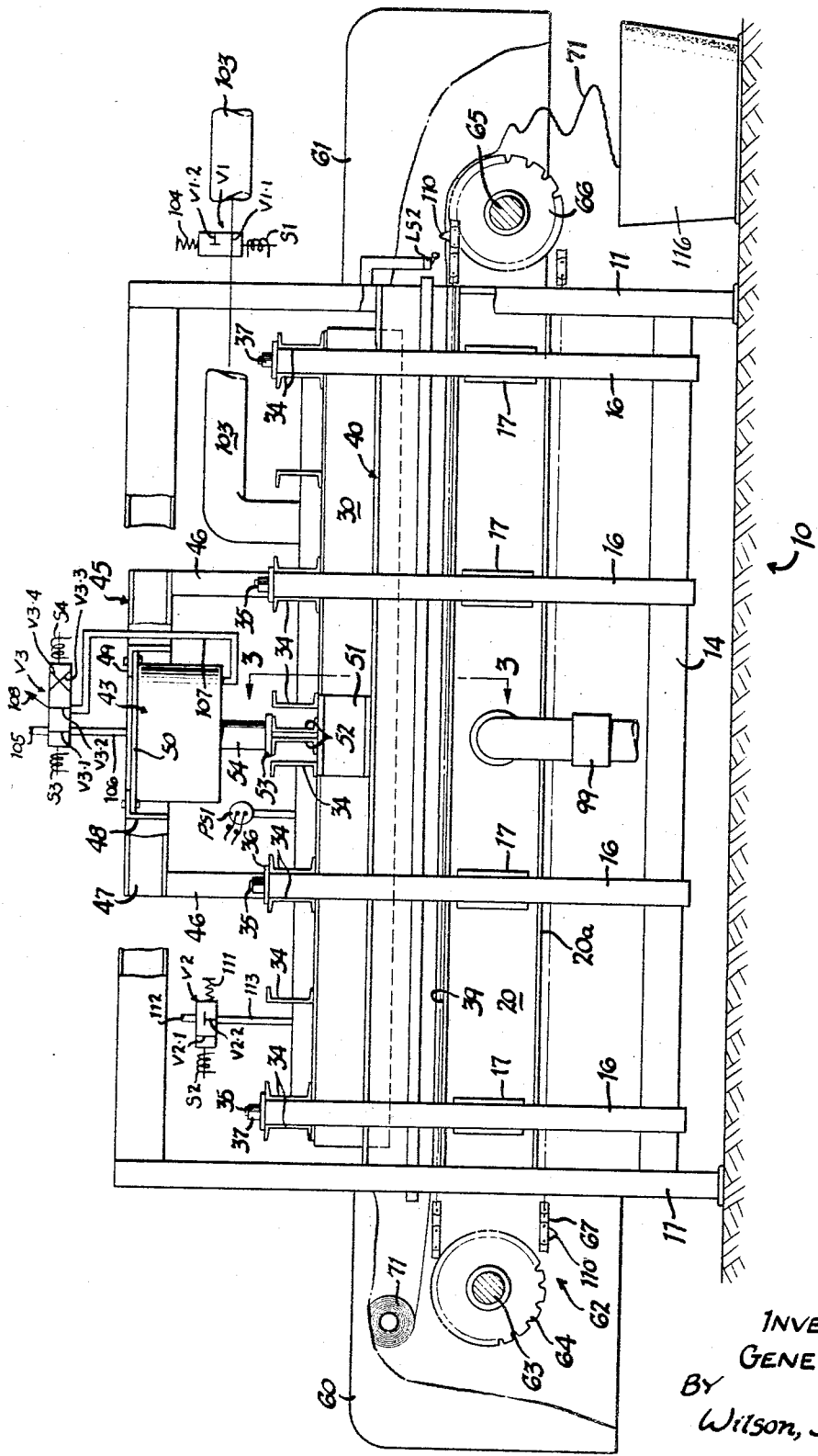
FIGURE 2 is the side elevational view of the filter apparatus of FIGURE 1.

In FIGURE 1, reference numeral 10 refers generally to the apparatus of the present invention. As shown in FIGURES 1 and 2, the apparatus 10 is provided with a generally rectilinear frame including vertical corner posts 11 in the form of rectangular tubes secured at their upper ends to longitudinal stringers 12 and to transverse stringers 13. The posts 11 are also joined adjacent their lower ends by longitudinal lower stringers 14 and transverse end stringers 15 which are appropriately cross-braced by additional longitudinal and transverse stringers. Secured to the longitudinal stringers 14 are additional upright intermediate posts 16 which are shorter than the corner posts 11 and which also are in the form of rectangular hollow tubes.

Secured to the intermediate tubes 16 are a plurality of mounting brackets 17 projecting inwardly therefrom to secure in fixed position a bottom fluid-conducting shell 20. This bottom shell 20 is generally rectangular in overall outline and, as best shown in FIGURES 3 through 5, is defined by rectilinearly assembled and secured peripheral channels 21, the flanges 22 of which are outwardly directed so that the upper surfaces 23 thereof define a horizontal shelf or support surface completely circumscribing the shell 20. The top flanges 22 surround the open upper rectangular face of the shell 20, while a closure plate 20a closes the similarly shaped and sized lower face of the shell. Further, the shell 20 is provided with interior support angles 24 (FIGURES 3 and 4) supporting thereon a plurality of longitudinally extending, relatively thin, edge-set support plates 25 providing a plurality of upper longitudinally extending support edges 26. These edges 26 project above the level of the shell flange surfaces 23 to underlie a support screen 27 which has its edges secured to peripheral support blocks 28 mounted at the inner edges of the channels 21, the wire being clamped by clamping plates 29 secured by suitable means, as by screws 29a to the blocks 28. Thus, the lower shell 20 is provided with a foraminous or water permeable upper surface defined by the screen 27 overlying the edge-set strips 25.

Carried by the intermediate posts 16 is an upper shell indicated generally at 30. The upper shell 30 is completely circumscribed by channels 31 similar to the channels 21, but with the flanges 32 thereof inwardly directed. The upper shell 30 is similar in overall outline to the lower shell 20, but is of substantially less longitudinal and transverse dimension, as will be readily seen by an inspection of FIGURES 2 through 4.

The upper shell 30 is provided with a fluid impermeable upper surface defined by plate 33 secured to the upper flanges 32 of the channels 31. Secured to this upper plate 33 at longitudinally spaced intervals are transversely extending reinforcing channels 34 (best shown in FIGURE 2), adjacent channels being spaced apart and in back-to-back relation to receive the upper ends of the posts 16 therethrough. The posts 16 have threaded studs 35 projecting freely upwardly therefrom, the studs being received through apertured mounting plates 36 which are welded or otherwise rigidly secured to the reinforcing channels 34. Mounting nuts 37 are threaded onto the studs 35 and serve to secure the upper shell 30 to the posts 16.

Thus, it will be seen that the two shells 20, 30 are carried by the framework elements 11–16 in fixed, spaced-apart relation, the lower extremity 38 of the upper shell and the upper extremity 39 of the lower shell both being open (FIGURE 5). Also, it will be noted that the shells are entirely fluid tight with the exception of their spaced, confronting open sides 38, 39.

As best illustrated in FIGURES 3 and 4, a movable seal frame is provided, this frame being indicated generally by reference numeral 40 and being assembled from channels 41 having out-turned upper and lower flanges 42. It will be noted that the seal frame 40 is telescopically movable relative to the upper frame 30, the seal frame being shown in its lowered operative position in FIGURE 3 and in its raised inoperative position in FIGURE 4. Actually, the seal frame 40 is of somewhat larger transverse and longitudinal dimensions than the lower shell, the frame flanges 42 thus lying outside the shell flanges 22, and these flanges being mutually parallel throughout their entire perimetric extent.

The seal frame 40 thus peripherally encloses the upper frame 30 when it is elevated (FIGURE 4) by means of an actuating cylinder 43. The cylinder 43 is carried by a subframe indicated generally at 45 and comprising upright channels or legs 46 secured to the upper shell channels 34 and joined by longitudinal channels 47. Longitudinal and transverse angle irons 48 have inwardly facing flanges 49 to which an upper support plate 50 is secured, so that the cylinder 43 is suspended to depend downwardly toward the seal frame.

The seal frame itself includes a pair of relatively short mounting channels 51 mounted medially thereon and a pair of back-to-back transverse channels 52 joined by a supporting plate 53 to which is secured the piston rod 54 of the cylinder 43. Extension of the cylinder rod 54 as illustrated in FIGURE 2 of the drawings will lower the seal frame to its operative position of FIGURE 3, while upward retraction of the piston rod 54 will elevate the seal frame 40 to its position illustrated in FIGURE 4 of the drawings.

To aid in guiding seal frame 40 in its vertical travel and also to aid in resisting any tendency of the seal frame for lateral displacement under operating conditions (to be hereafter more fully described), the seal frame is provided with a plurality of transversely projecting guide brackets 56 (FIGURES 3 and 4) projecting transversely from the seal frame channel 41 and secured therethrough by suitable means, as by a mounting channel 57. Each such bracket 56 bears at its outer end a roller 58 contacting the adjacent inner surface 59 of that post 16 toward which the bracket 56 is directed.

Referring to FIGURES 2, 3 and 4 of the drawings, it will be seen that each end of the main frame of the machine is provided with an open-bottomed, generally rectangular sheet metal enclosure or "vestibule." These sheet metal enclosures 60, 61 are secured to the frame in an appropriate manner and serve to support a filter medium conveying structure, indicated generally at 62. More particularly, the inlet vestibule 60 provides an appropriate journal mounting for an idler shaft 63 upon which is mounted an idler sprocket 64. Mounted in the outlet vestibule 61 is a drive shaft 65 upon which is mounted a drive sprocket 66. A pair of such sprockets 64, 66 is provided in each vestibule, the transverse spacing between the sprockets of each pair being somewhat greater than the transverse width of the lower shell 20. Trained about each of the sprockets 64, 66 is an endless chain 67, two chains thus being provided, one on each side of the lower shell 20.

As illustrated in FIGURES 3 and 4, these chains are supported by the upper surfaces of guide channels 68 for longitudinal displacement, the guide channels 68 being carried by the lower shell mounting brackets 17 and bridging the longitudinal gaps therebetween. Also, it will be noted that chains run between the vertical supports 16 and outside the confines of both of the filter shells 20, 30 and outside the seal frame 40.

The chains 67 are each secured to and serve to convey longtiudinally an endless screen 70. The upper horizontal reach of this screen 70 overlies the lower shell 20 and is supported upon the edges 26 of the support plates 25 heretofore described and as shown in FIGURE 5. Upon actuation of the drive sprocket 66, as by the drive motor 69 (FIGURE 1), the screen 70 is advanced longitudinally between the shells 20, 30.

Also, as best shown in FIGURE 2, the inlet vestibule 60 encloses a supply roll 71 of disposable filter medium, such as paper or the like, this medium 71 being superimposed upon the screen 70 for travel therewith through the space intermediate the shells 20, 30. The paper medium travels horizontally with the upper reach of the screen and departs therefrom only after the screen is deflected into its lower return path as it travels about the drive sprocket 66.

As best shown in FIGURES 3 through 5, the seal frame 40 carries a sealing element indicated generally at 75. More specifically, the sealing element 75 is formed of an elastomeric material, such as rubber, neoprene or the like, and is secured to the peripheral seal frame channel 41. An attachment plate 77 is secured to the undersurface 76 of the channel flange 42 by suitable means, as by welding, to project inwardly of the flange and an elongated inner securing block 78 is secured to the plate 77 by welding or the like. This block 78 is vertically apertured at spaced intervals to receive bolts 80 securing a lower mounting plate 81 thereto.

This plate 81 projects outwardly in spaced parallel relation to the plate 77 and serves to secure therebetween an attachment flange 82 formed integrally with the sealing element 75. The sealing element 75 is provided with a serrated upper surface 83 contacting the undersurface of the strip 77 and with a serrated lower surface 84 contacting the paper medium 71 as it is supported on the conveyor screen 70. Since the elastomeric seal 75 lies outwardly of the support structure, including block 78 and plate 81, the elements 78, 81 can be preassembled, and the seal manually stretched or expanded and resiliently snapped beneath the plate 77 into the recess defined by the members 77, 78 and 81.

To aid in sealing the medium 71, the upper flange 22 of the lower shell channel 21 is provided with a mounting angle 85 cooperating with the mounting plate 29 heretofore described to confine therebetween a fixed seal element 86 formed of rubber or similar material, and having an exposed upper surface 87 opposing the serrated surface 84 of the element 75.

Additionally, the peripheral channel 31 of the upper shell 30 is provided with an outwardly directed peripheral sealing shelf 88 upon which is mounted a second fixed elastomeric sealing strip 89 secured in place by appropriate mounting brackets 90. This sealing strip 89 is substantially identical to the sealing element 75 heretofore described (the strip 89 being somewhat smaller in perimetric extent) and is provided with a serrated upper surface contacting the undersurface of a sealing shelf 92 projecting inwardly from the inner surface of the seal frame channel 41.

The vertical distance between the sealing element 86 (carried by the lower shell 20) and the upper seal element 89 (carried by the upper shell 30) is carefully correlated with the distance between the seal element 75 (carried by the lower flange 42 of the seal frame 40) and the undersurface of the sealing shelf 92 (carried by the channel web 41 of the seal frame 40).

Thus, it will be readily seen that actuation of the cylinder 43 to extend the piston 54 will result in sealing engagement between the sealing elements 86, 75 and the sealing element 89 with the shelf 92 (as illustrated in FIGURE 3 of the drawings). When the elements are positioned as shown in FIGURE 3 of the drawings, the filter medium 71 is engaged by the sealing element 75 to completely peripherally seal the medium 71 against the lower shell. At the same time, the seal frame 40 is completely peripherally sealed to the upper shell 30 by means of engagement of the sealing elements 89, 92. When the cylinder 43 is actuated to retract the piston 54, substantially all of the space between the lower shell 20 and the upper shell 30 is open to accommodate actuation of the conveyor 67 and movement of the conveyor screen 70 and the filter medium 71 in the manner to be hereinafter more fully described.

*Operation*

Figure 6:
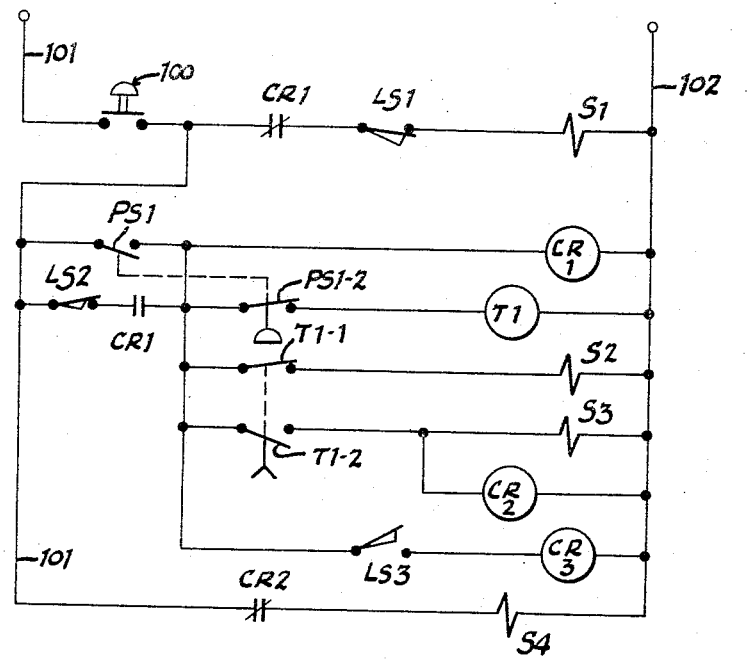
FIGURE 6 is a schematic wiring diagram illustrating the control circuit for the device of the present invention.

As illustrated in FIGURES 1, 2 and 6 of the drawings, the operation of the device will be readily understood.

More specifically, assuming that the filter is in operation and in its condition of FIGURE 2 of the drawings, the cylinder 43 has been actuated to lower the seal frame 40 to its position of FIGURE 3 of the drawings. Under these circumstances, the limit switch LS1 mounted on one of the corner posts 16 and contacted by one of the brackets 56 is actuated to its closed position.

From FIGURE 6, it will be seen that the control circuit is such that closure of the limit switch LS1 will actuate a solenoid valve S1, assuming that the relay CR1 is deactivated and that the manual cycling switch indicated generally at 100 in FIGURE 6 has been depressed so that there is current flow via conductors 100, 101 and 102.

Referring now to FIGURE 2 it will be seen that the solenoid S1 controls the actuation of a valve V1 having a flow passage V1–1 interposed in conduit 103 for supplying contaminated water to the upper fluid conducting shell 30. The valve V1 thus is actuated by the solenoid S1, so that flow through the conduit 103 and into the shell 30 occurs. A spring 104 opposes the solenoid S1 and urges the valve V1 in the opposite direction so that when the solenoid S1 is deenergized, a blind or stop passage V1–2 is interposed in the line 103 and flow through the conduit 103 into the shell 30 will be stopped. Filtrate flow from the lower shell 20 is accommodated by drain line 99.

Further, under normal operating conditions, the conductors 101 and 102 also supply current to a solenoid S4 (assuming the relay CR2 is not energized). As seen from FIGURE 2, this solenoid S4 constitutes part of a valve V3 which is interposed in a fluid pressure conduit 105 for supplying fluid pressure to the seal actuating cylinder 43. The valve V3 is provided with a passage V3–1 interconnecting the conduit 105 and the conduit 106, thus introducing fluid into the top of the cylinder 43 to actuate the seal frame 40 to its illustrated position of FIGURE 2 when the solenoid S4 is actuated. A conduit 107 from the lower end of the cylinder 43 is vented to exhaust through line 108 by means of valve passage V3–2.

From the foregoing discussion, it will be seen that the fluid under pressure in the upper shell 30 (entering through conduit 103) causes flow downwardly through the medium 71 to exit through conduit 99. As the medium 71 clogs with contaminant particles, the pressure required to drive the fluid through the medium and the accreted contaminant increases. Thus, there is always a fluid pressure present in the upper shell 30 and in the seal frame 40, so long as the frame is in its position of FIGURE 3.

This pressure in the seal frame 40, of course, is omnidirectional and acts both perimetrically upon the frame channel web 41 (tending to expand the seal frame) and vertically upon any exposed horizontal surfaces of the seal frame. From FIGURE 3 it will be seen that there are two such horizontal surfaces which are each of appreciable area, since they extend completely about the seal frame. The undersurface of the sealing shelf 92 is so exposed and is of an effective transverse dimension "B," while the exposed upper surface of the plate 77 is of an effective transverse dimension "A." Since the surfaces are of substantially the same length (the inner perimeter of the seal frame 40) it will be appreciated that the larger upwardly directed surface of the plate 77 presents the larger area.

Due to this differential area, there will be a net force exerted on the seal frame urging the seal frame downwardly toward the lower shell, i.e., toward its sealing position of FIGURE 3. Thus, the pressure in the upper shell 30 actually aids in sealing the structure, and this net sealing force increases directly as the pressure increases. The lessened output force required from the actuating cylinder 43 to maintain the seal and the improvement of sealing efficiency will be readily comprehended.

It is contemplated that the very slight clearance between the medium 71 and the superimposed plate 81 (FIGURE 5) will not result in any appreciable upward force component, since the pressure drop is across the medium itself and any accretion of contaminant on the medium will rapidly form a seal between these two closely adjacent surfaces.

A second solenoid S3 is provided for actuating the valve body V3 in the reverse direction, so that valve passage V3–3 interconnects the conduit 107 with the supply conduit 105 and interconnects the conduit 106 with the exhaust conduit 108. Thus, when the solenoid S3 is actuated, the cylinder 43 will have fluid under pressure introduced into its lower extremity, and the seal frame 40 will be elevated to its position of FIGURE 4.

A pressure switch PS1 is provided atop the upper shell 30, this switch being subject to the pressure interiorly of the shell and being actuated by pressure exceeding a predetermined maximum pressure which corresponds to the back pressure generated interiorly of the shell 30 when the filter medium 71 has become clogged to an extent such that renewal of the medium 71 is necessary or desired. Referring now to FIGURE 6, it will be seen that this pressure switch PS1, when closed, actuates a control relay CR1.

One of the conveyor chains 67 (FIGURE 2) is provided with a plurality of spaced abutments 110 which project above the level of the conveyor chains 67. Since these conveyor chains are positioned laterally outside the confines of the shells 20, 30 and also outside the seal frame 40 alongside the outer marginal edges of the filter medium 71 and the supporting screen 70, these abutments can contact a limit switch LS2 carried by one of the corner posts 11 and depending therefrom for actuation by the abutments 110.

The limit switch LS2 is normally closed, since the abutment with the limit switch shuts off the conveyor motor (in a manner to be hereinafter more fully disclosed), and the stopping motion or momentum of the chains 67 will carry the abutment beyond the location of the limit switch LS2 indicated in FIGURE 2 of the drawings. Thus, the limit switch LS2 is normally closed and, upon actuation of the relay CR1 to close the relay points, the relay CR1 remains actuated regardless of the condition of the pressure switch PS1.

A timer T1 is actuated by the closed limit switch LS2, the actuated relay points CR1 and by a second pressure switch contact blade PS1–2. Thus, closure of this pressure switch PS1 will actuate the timer T1. Actuation of the timer will close contact blade T1–1 to thereby actuate solenoid S2.

As illustrated in FIGURE 2 of the drawings, solenoid S2 actuates a valve V2 against the bias of a spring 111, so that valve passage V2–1 interconnects an air supply conduit 112 with an air passage conduit 113 connected to the interior of the upper shell 30. When the solenoid S2 is deactivated, the spring 111 positions a blind or stop passage V2–2 between the conduits 113 and 112 to prevent the flow of air into the shell 30. Thus actuation of the timer T1 will energize the solenoid S2 and introduce air under pressure into the upper shell 30 to blow down the contents thereof through the filter medium for that period of time during which the timer T1 "times out" or is actuated.

Upon the expiration of the time delay of the timer T1, the timer blade contact T1–1 is elevated to de-energize the solenoid S2 (shutting off the flow of air into the upper shell 30) while a second timer blade T1–2, which is normally closed when the timer is not actuated, actuates the solenoid S3 and a relay CR2. This solenoid S3 is that which has been earlier described in connection with the valve body V3, and the corresponding displacement of the valve body V3 interconnects the conduit 107 and the supply conduit 105, so that fluid under pressure is introduced into the underside of the cylinder 43 to raise the seal frame 40 from its position of FIGURE 3 to its position of FIGURE 4. At the same time, relay CR2 is energized, thereby de-energizing the solenoid S4 so as to accommodate the actuation of the valve V3 as heretofore described.

When the seal assumes its fully raised position, limit switch LS3 carried by the post 16 and contacted by the bracket 56 is actuated (FIGURE 4), closure of this limit switch actuating relay CR3 for the conveyor motor 69 (FIGURE 1). The motor 69 advances the conveyor by driving the sprocket 66 (FIGURE 2) in a clockwise direction. Inasmuch as the seal frame is in its elevated position, the filter medium 71 and the filter medium support screen 70 can now be advanced by the conveyor chains 67 between the open confronting faces 38, 39 of the shells 30, 20 respectively.

Such advancement will continue until the next successive abutment 110 contacts the limit switch LS2. At this time, the conveyor has been advanced to an extent such that the contaminated or previously utilized filter medium 71 has fallen from the support screen 70 as the screen passes about the drive sprocket 66, this used filter medium entering a suitable receptacle 116, and fresh length of filter medium from the supply roll 71 has been positioned between the faces 38, 39 of the shells.

When the abutment 110 contacts the limit switch LS2, the limit switch LS2 is opened, and the conveyor motor CR3 is shut off. Of course, the conveyor motor and the conveyor itself coasts to a stop so that the abutment 110 is displaced beyond the limit switch LS2. Thus, the limit switch is allowed to assume its normally closed position of FIGURE 6. However, the circuit to the relay CR1 has been opened, so the relay contacts CR1 are open and subsequent closure of the limit switch LS2 will not actuate the timer or any of the other of the mechanism. Thus, reactivation of the circuit can not occur until such time as the relay CR1 is actuated by the pressure switch PS1.

Of course, the above described deactivation of the relay CR1 also de-energizes the solenoid S3 while the corresponding deactuation of the relay CR2 actuates the solenoid S4. This actuation of the solenoid S4 will shift the valve body V3 to the right, i.e. to its position of FIGURE 2, and fluid under pressure is again introduced into the upper end of the cylinder 43 through the lines 105 and 106 connected by the valve passage V3–1. The resultant introduction of fluid under pressure into the cylinder 43 moves the seal frame 40 downwardly to re-engage the seal surfaces 84, 87 with the filter medium 71 and to re-engage the seals 89, 92 with one another. Additionally, the limit switch LS1 is actuated and this limit switch, in conjunction with the normally closed contacts of the relay CR1, reenergizes the solenoid S1 so that the valve passage V1–1 of the valve V1 is interposed in the conduit 103 and contaminated liquid is again introduced into the upper shell 30. Thus, the cycle is completed and the filter mechanism will continue to operate until such time as the pressure switch PS1 is again actuated.

Figure 7:
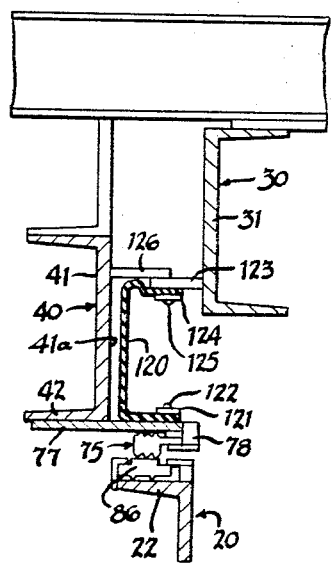
FIGURE 7 is a view similar to FIGURE 3 illustrating a modified form of apparatus of the present invention, showing the seal in its operative closed position.
Figure 8:
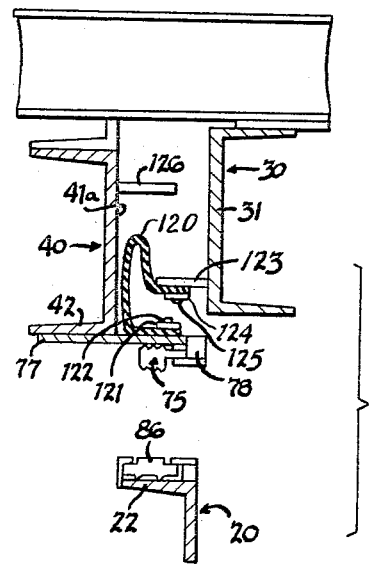
FIGURE 8 is a view similar to FIGURE 4 showing the modified form of seal of FIGURE 7 in its open or inoperative position.

*The embodiment of FIGURES 7 and 8*

It will be recalled from FIGURES 3 and 4 that upper seal element 89 engages the sealing shelf 92 when the seal frame 40 is displaced vertically downwardly into its sealing position, as illustrated in FIGURE 3.

FIGURES 7 and 8 of the drawings illustrate a modified form of the invention wherein a closure diaphragm is provided which maintains a constant seal between the upper shell 30 and the seal frame 40. Referring more particularly to FIGURES 7 and 8, the seal frame 40 is identical with the seal frame heretofore disclosed, while the upper shell 30 is also identical with the shell heretofore disclosed. Further, the shell 40 carries the sealing element 75 to its lower extremity, as has heretofore been described, this lower seal element cooperating with a seal element 86 carried by the lower shell 20, also as heretofore described.

A closure diaphragm 120 formed of a flexible elastomeric material, such as rubber or the like, is provided in the form of an elongated rectangular strip, one longitudinal edge of this strip being secured to the entire periphery of the seal frame 40. More particularly, the diaphragm is secured to the upper surface of the plate 77, as by a sealing bar 121 secured to the plate 77 of the seal frame by suitable means, as by bolts 122. The other longitudinal edge of the closure diaphragm 120 is clamped to an outwardly directed backup plate 123 which is secured, as by welding, to the outer periphery of the web 31 of the upper shell 30 to project horizontally outwardly therefrom adjacent the lower exterior corner of the shell. The sealing of the inner edge of the diaphragm to the backup plate 123 is accomplished by continuous bar 124 confining the diaphragm edge against the plate 123 and secured to the plate 123 by suitable means, as by bolts 125. The transverse extent of the closure diaphragm is such that it bridges the gap between the upper shell 30 and seal frame 40 at each of the adjusted positions of the seal frame relative to the shell as will be readily apparent from a study of FIGURES 7 and 8.

Fluid pressure internally of the shell 30 will be exerted upon the diaphragm to displace the diaphragm outwardly into extended, full surface engagement with the interior surface 41a of the channel web 41 of the seal frame 40. Upward pressure displacement of the diaphragm is limited by a backup plate 126 (similar to the sealing shell 92, above described) and which is parallel to the plate 123 and carried by the interior surface 41a of the seal frame 40. Thus, the closure diaphragm is continuously backed up by the seal frame itself, by the upper surface of plate 77, and by the backup plates 123, 126 so that there will be substantially no unbalanced pressure acting directly upon any non-backed portion of the diaphragm and tending to distend the same. The same net sealing force advantages are obtained, as are above explained, since the plate 77 is of substantially greater extent than the upper sealing shell portion exposed to the fluid pressure.

Upon vertical upward movement of the seal frame to accommodate displacement of the filter medium for replenishment or replacement, the closure diaphragm will continue to effect the seal between the upper shell 30 and the seal frame 40, the diaphragm merely assuming a collapsed or corrugated configuration as indicated in FIGURE 8 of the drawings. Of course, during such movement of the seal frame, there is no distending pressure force on the seal diaphragm. If desired or necessary this corrugated configuration can be predetermined by varying the thickness of the diaphragm across its transverse extent.

Summary

The present invention, as heretofore described in detail, provides a new and novel method of and apparatus for the filtration of contaminated particles from a fluid in which such particles are suspended, the method and the apparatus possessing several primary advantages over the prior art and over prior developments which I myself have made, these primary advantages being as follows:

(1) The seal frame, being movable, provides a means whereby the shells may be fixed and adequately braced against the fluid pressures through which they are subjected, thereby accommodating a filter mechanism of (1) increased filtration surface area and/or (2) capable of operation at a higher differential pressure at the filtration surface.

(2) The seal frame itself is subjected to a relatively low side thrust pressure which is substantially balanced peripherally of the seal frame and which can be readily counteracted by a guiding structure.

(3) The only actuating forces which must be exerted on the structural shell and seal frame structure during operation of the apparatus are (1) the force necessary to move the relatively light seal frame itself and (2) the closure force necessary to sealing engagement of the seals carried by the filter frame and the shells, respectively.

(4) The fluid pressure internally of the upper shell and the seal frame tends to effect and maintain the seal, due to the net effective force urging the seal frame downwardly. The result of such a net effective force is that the size and capacity of the actuating mechanism can be drastically reduced. Further, as the internal pressure increases, the sealing forces increase. The differential area of the seal frame exposed to the downward thrust of the internal pressure, while not required for operability, is a great advantage of this invention.

(5) The sealing elements are extremely simple in design, being subjected only to compression to effect and maintain a full peripheral seal. Thus, the provision of elaborate, inflatable seals is not necessary, and reliable sealing action can be readily attained.

(6) The provision of a horizontal filter medium surface readily adapts the device of the present invention for utilization with many different forms of filter medium. Particularly, the apparatus and method are readily adaptable to the utilization of a replenishable paper medium (as illustrated in the drawings) but the device can be readily adapted to the utilization of a filter medium which is permanently fixed in position and which is cleaned by a scraper or the like. Further, the device may be readily utilized to support a pre-coat medium such as diatomaceous earth or the like, upon either a disposable or permanent filter medium. This utilization of pre-coat filter media is particularly facilitated because of the application of the media to a horizontal surface from which the media will not be dislodged by an accidental failure of inlet fluid pressure.

Many other secondary advantages will also be obtained, e.g., the simple and inexpensive structure of the shell support elements, the large opening between the shells to accommodate medium displacement, etc.

While certain embodiments of the invention have been described above, it will be apparent to those skilled in the art that the described embodiments may be modified. Therefore, the foregoing description is to be considered exemplary rather than limiting, and the true scope of the invention is that defined in the following claims.

I claim:

1. A filter apparatus comprising a pair of fixed filter shells having their open confronting faces spaced from one another, a seal frame telescopically movable relative to one of said filter shells, said other shell having a perimetric ledge providing a sealing surface, said seal frame having a perimetric sealing strip sealingly engageable with said perimetric ledge of said other shell, additional seal means interposed between said seal frame and said one filter shell, a filter medium interposed between said shells, said sealing strip also being engageable with said filter medium to urge said medium against said ledge, means for introducing contaminated liquid under pressure into one of said shells and for removing filtrate liquid from the other of said shells, and means for actuating said seal frame for telescopic movement into and out of engagement with said ledge, said seal frame having a surface exposed to the pressure of said contaminated liquid so that the pressure urges said seal frame into engagement with said filter medium and said ledge.

2. In a method of filtering contaminant particles from a liquid, the steps of interposing a liquid permeable filter medium between the spaced confronting open faces of a pair of liquid conducting shells, telescoping a hollow seal frame over one of said shells in a first direction toward said medium, peripherally confining said medium between a perimetric elastomeric seal carried by said frame and a perimetric sealing ledge on the other of said shells, sealing said frame to said one shell, introducing contaminated liquid under pressure into one of said shells, exposing a surface of said seal frame to the pressure of said contaminated liquid so that the pressure urges said seal frame into engagement with said filter medium and said sealing ledge, flowing liquid through said medium to accrete contaminant particles thereon, removing filtrate liquid through the other of said shells, interrupting the flow of liquid into the one shell in response to a predetermined pressure drop across said medium, telescoping said seal frame in a direction opposite to said first direction to release said medium from said peripheral confinement, and removing said medium and accreted contaminant particles from between the spaced faces of said shells.

3. A filter apparatus comprising a pair of fixed filter shells having their open confronting faces spaced from one another, each such face being surrounded by an outwardly projecting ledge surface and said open face of one of said shells being of substantially greater lateral and longitudinal extent than the open face of the other of said shells, a seal frame surrounding and telescopically movable relative to said other of said filter shells, said seal frame having a perimetric inwardly projecting ledge surface overlying the corresponding outwardly projecting surface of said one shell, a sealing strip on each of said overlying ledge surfaces for sealing engagement with one another upon movement of said seal frame toward said one shell, additional seal means interposed between said seal frame and said other filter shell, a filter medium interposed between said shells to be directly contacted by said sealing strips, means for introducing contaminated liquid under pressure into said other shell, means for removing filtrate liquid from said one shell and means for telescopically moving said seal frame about said other shell into sealing engagement with said one shell, the inwardly projecting ledge surface of said frame being exposed to the pressure of liquid in said other shell to urge said sealing strips into engagement.

4. In a filter apparatus including a pair of fixed filter shells having their open confronting faces spaced from one another, the improvements of a seal frame telescopically movable relative to one of said filter shells, said seal frame having a perimetric sealing strip sealingly engageable with the other of said shells, a sealing diaphragm sealing said seal frame to said one filter shell, said seal frame having surfaces backing said diaphragm providing support therefor, a filter medium interposed between said shells, means for introducing contaminated liquid into one of said shells and for removing filtrate liquid from the other of said shells, and means for actuating said seal frame for telescopic movement accommodated by said diaphragm.

5. In an apparatus for filtering contaminant particles from a liquid, by means of a liquid permeable filter medium interposed between the spaced confronting open faces of a pair of fixed liquid conducting shells, the improvements of a movable seal frame surrounding one of said shells, said seal frame and said other shell having overlapping ledges providing sealing surfaces, means for moving said seal frame relative to said shells, a first elastomeric seal carried by said frame to said ledge thereof to project toward the ledge of the other of said shells, said seal engaging said medium and urging said medium against said ledge of said other shell, and a secondary seal carried by said one of said shells for sealing engagement with said frame whenever said first seal engages said medium.

6. In a method of filtering contaminant particles from a liquid wherein a liquid permeable filter medium is interposed between the spaced confronting open faces of a pair of liquid conducting shells, the steps of telescoping a seal frame over one of said shells in a first direction toward said medium, peripherally confining said medium between elastomeric sealing elements carried by overlapping ledges on said frame and the other of said shells, respectively, thereby sealing said frame to said other shell, simultaneously sealingly engaging said frame with the one shell, introducing contaminated liquid under pressure into one of said shells, flowing liquid through said medium to accrete contaminant particles thereon, removing filtrate liquid through the other of said shells, interrupting the flow of liquid into the one shell in response to a predetermined pressure drop across said medium, telescoping said seal frame in a direction opposite to said first direction (1) to release said medium from said peripheral confinement and (2) to release said frame from sealing engagement with said shells, and removing said medium and accreted contaminant particles from between the spaced faces of said shells.

7. In a method of filtering contaminant particles from a liquid by passing the liquid through a liquid permeable filter medium interposed between the spaced confronting open faces of a pair of liquid conducting shells, contaminated liquid being introduced under pressure into one of said shells and filtrate liquid being removed through the other of said shells, the steps of moving a peripheral seal frame into contact with said medium (1) to engage an elastomeric seal on said frame with said medium and urge said medium against the other of said shells and (2) to seal said frame to said other shell, said seal frame also being sealed to said one shell, exerting the liquid pressure in said one shell on said frame to aid in the performance of steps (1) and (2) above, interrupting the flow of liquid through the medium when clogged, thereby terminating the exertion of pressure on said frame, disengaging said elastomeric seal from said medium (a) to release said medium from said peripheral confinement and (b) to unseal said frame from said other shell, and removing said medium and accreted contaminant particles from between said shells.

8. A filter apparatus comprising a pair of fixed filter shells having their open confronting faces spaced from one another, each such face being surrounded by an outwardly projecting ledge surface and said open face of one of said shells being of substantially greater lateral and longitudinal extent than the open face of the other of said shells, a seal frame surrounding said other of said filter shells, said seal frame having a perimetric ledge surface exposed to the interior of said other shell and registering with the corresponding surface of said one shell, a sealing strip on each of said registering ledge surfaces for sealing engagement with one another, a diaphragm-type flexible seal means interposed between said seal frame and said other filter shell and secured thereto to form a permanent seal therebetween, a filter medium interposed between said shells to be directly contacted by said sealing strips, means for introducing contaminated liquid under pressure into said other shell, means for removing filtrate liquid from said one of said shells, and means for moving said seal frame relative to said shells.

9. In an apparatus for filtering contaminant particles from a liquid by means of a liquid permeable filter medium interposed between the spaced confronting open faces of a pair of fixed liquid conducting shells, at least one of said shells containing liquid under pressure in the operation of said apparatus, the improvements of a movable seal frame surrounding one of said shells, and having a greater surface area exposed to said pressure tending to urge said frame toward said other of said shells rather than toward said one shell, means for moving said seal frame relative to said shells, a first elastomeric seal carried by said frame to project toward the other of said shells, said seal engaging said medium and urging said medium against said other shell, and a secondary seal interposed between said frame and said one shell, liquid under pressure in said one shell acting on said greater surface area to urge said frame toward said other shell.

10. In a method of filtering contaminant particles from a liquid, the steps of interposing a liquid permeable filter medium between the spaced confronting open faces of a pair of liquid conducting shells, telescoping a seal frame over one of said shells in a first direction toward said medium, said seal frame and said other shell having overlapping ledges, peripherally confining said medium between an elastomeric seal carried by said ledge of said frame and said ledge of the other of said shells, sealing said frame to said one shell, introducing contaminated liquid under pressure into one of said shells, utilizing said liquid under pressure to urge said frame toward said other shell, flowing the liquid through said medium to accrete contaminant particles thereon, removing filtrate liquid through the other of said shells, interrupting the flow of liquid into the one shell in response to a predetermined pressure drop across said medium, telescoping said seal frame in a direction opposite to said first direction to release said medium from said peripheral confinement, and removing said medium and accreted contaminant particles from between the spaced faces of said shells.

11. In a method of filtering contaminant particles from a liquid by passing the liquid through a liquid permeable filter medium interposed between the spaced confronting open faces of a pair of liquid conducting shells, contaminated liquid being introduced under pressure into a first of said shells and filtrate liquid being removed through the other of said shells, the steps of positioning a seal frame about said first of said shells, urging said frame in a first direction toward said medium by subjecting said frame to the pressure of liquid in said first shell to peripherally confine said medium against the other of said shells by an elastomeric seal carried by said frame, said frame also being sealed to said first shell, interrupting the flow of liquid into said first shell when the medium becomes clogged, telescoping said seal frame in a direction opposite to said first direction to release said medium from said peripheral confinement, and removing said medium and accreted contaminant particles from between said shells.

12. In a method of filtering contaminant particles from a liquid by passing the liquid through a liquid permeable filter medium interposed between the spaced confronting open faces of a pair of liquid conducting shells, contaminated liquid being introduced into one of said shells and filtrate liquid being removed through the other of said shells, the steps of telescoping a seal frame over one of said shells in a first direction toward said medium, said frame and said other shell having overlapping ledges, engaging an elastomeric seal on said ledge of said frame with said medium (1) to peripherally confine said medium against the ledge of the other of said shells and (2) to seal said frame to said other shell, simultaneously sealing said frame to said one shell, interrupting the flow of liquid through the medium when clogged, telescoping said seal frame in a direction opposite to said first direction (1) to release said medium from said peripheral confinement and (2) to unseal said frame from said shells, and removing said medium and accreted contaminant particles from between said shells.

13. In a filter apparatus of the type wherein a pair of fixed superimposed fluid conducting shells have their open confronting faces spaced to receive therebetween a substantially horizontal filter medium, and contaminated fluid under pressure is introduced into the upper of said shells to flow through the medium into the lower shell, the improvement of means to seal the shells to one another, said means comprising a hollow seal frame surrounding the upper shell and having an interior ledge, the upper surface of said ledge being exposed to the fluid pressure in said upper shell and the lower surface of said ledge bearing an elastomeric seal engageable with the medium to confine the medium against the lower shell by the force exerted by the pressure on said ledge upper surface, and means sealing said frame to said upper shell.

14. A filter apparatus comprising a pair of fixed filter shells having their open confronting faces spaced from one another, each such face being surrounded by a ledge surface and said open face of one of said shells being of substantially greater lateral and longitudinal extent than the open face of the other of said shells, a movable seal frame surrounding said other of said filter shells, said seal frame having a perimetric ledge surface exposed to the interior of said other shell and registering with the corresponding surface of said one shell, a sealing strip on each of said registering ledge surfaces for sealing engagement with one another, seal means interposed between said seal frame and said ledge surface of said other filter shell, a filter medium interposed between said shells to be directly contacted by said sealing strips, means for introducing contaminated liquid under pressure into said other shell, means for removing filtrate liquid from said one of said shells, and means for moving said seal frame relative to said shells.

15. In a filter apparatus of the type wherein a pair of fixed superimposed fluid conducting shells have their open confronting faces spaced to receive therebetween a substantially horizontal filter medium, and contaminated fluid under pressure is introduced into the upper of said shells to flow through the medium into the lower shell, the improvement of means to seal the shells to one another, said means comprising a hollow, movable seal frame surrounding one of said shells and having a ledge extending about the same, one surface of said ledge being exposed to the fluid pressure in said one shell and the opposite surface of said ledge bearing on elastomeric seal engageable with the medium to confine the medium against the other shell by the force exerted by the pressure on said one surface of said ledge, and means for sealing said frame to said one shell.

16. In a filter apparatus of the type wherein a pair of fixed superimposed fluid conducting shells have their open confronting faces spaced to receive therebetween a substantially horizontal filter medium, and contaminated fluid under pressure is introduced in the upper of said shells to flow through the filter medium into the lower shell, the improvement of means to seal said shells to one another, said means comprising a pair of vertically spaced ledges, one on each of said shells, for providing sealing surfaces for said shells, a hollow movable seal frame surrounding one of said shells and having a pair of vertically spaced ledges registering respectively with the ledges of said shells, and means for moving said seal frame relative to said shells to move the lower of said seal frame ledges into contact with the medium and the lower of said shell ledges and to move the upper of said seal frame ledges into contact with the upper of said shell ledges to thereby seal said frame to each of said shells, thus sealing said shells to one another with said filter medium therebetween, selected ones of said ledges carrying elastomeric sealing members to seal the upper ones of said ledges together and the lower ones of said ledges together when in contact.

References Cited

UNITED STATES PATENTS

| | | | |
|---|---|---|---|
| 1,117,961 | 11/1914 | Phillips | 285—225 |
| 1,581,755 | 4/1926 | Meyer | 285—302 X |
| 1,923,124 | 8/1933 | Stanley | 285—225 |
| 2,867,324 | 1/1959 | Hirs | 210—387 X |
| 2,867,326 | 1/1959 | Hirs | 210—387 X |
| 2,955,850 | 10/1960 | Bellinger | 285—302 X |
| 2,969,148 | 1/1961 | Hirs | 210—387 X |
| 3,098,429 | 7/1963 | Hagglund | 210—226 X |
| 3,131,642 | 5/1964 | Geer et al. | 285—302 X |
| 3,190,451 | 6/1965 | Holland | 210—401 X |

REUBEN FRIEDMAN, *Primary Examiner.*

J. DE CESARE, *Assistant Examiner.*